United States Patent
Shao et al.

(10) Patent No.: US 9,392,565 B2
(45) Date of Patent: Jul. 12, 2016

(54) METHOD AND SYSTEM FOR ACCURATE CLOCK SYNCHRONIZATION THROUGH INTERACTION BETWEEN COMMUNICATION LAYERS AND SUB-LAYERS FOR COMMUNICATION SYSTEMS

(75) Inventors: Huai-Rong Shao, San Jose, CA (US); Ju-Lan Hsu, San Jose, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 12/983,208

(22) Filed: Dec. 31, 2010

(65) Prior Publication Data

US 2011/0216747 A1    Sep. 8, 2011

Related U.S. Application Data (60) Provisional application No. 61/311,136, filed on Mar. 5, 2010, provisional application No. 61/312,628, filed on Mar. 10, 2010.

(51) Int. Cl.
*H04J 3/06* (2006.01)
*H04W 56/00* (2009.01)

(52) U.S. Cl.
CPC ........ *H04W 56/0065* (2013.01); *H04W 56/005* (2013.01); *H04J 3/0685* (2013.01); *H04W 56/0015* (2013.01)

(58) Field of Classification Search
None
See application file for complete search history.

(56) References Cited

U.S. PATENT DOCUMENTS

| 6,975,652 B1 | 12/2005 | Mannette et al. |
| 7,000,031 B2 | 2/2006 | Fischer et al. |
| 7,120,092 B2 | 10/2006 | Pavon et al. |

(Continued)

FOREIGN PATENT DOCUMENTS

| JP | 2006109433 A | 4/2006 |
| JP | 2007324729 A | 12/2007 |

(Continued)

OTHER PUBLICATIONS

International Search Report and Written Opinion dated Oct. 20, 2011 for International Application No. PCT/KR2011/001481 from Korean Intellectual Property Office, pp. 1-10, Seo-gu, Daejeon, Republic of Korea.

(Continued)

*Primary Examiner* — Jutai Kao
(74) *Attorney, Agent, or Firm* — Sherman IP LLP; Kenneth L. Sherman; Steven Laut (57) ABSTRACT

Time synchronization in a wireless communication system comprises transmitting a synchronization frame from a transmitter to a receiver over a wireless communication medium. The synchronization frame includes a timestamp indicating the transmitter local time when a symbol at a predefined position of the synchronization frame is placed on the wireless communication medium for transmission. The synchronization frame is received at the receiver which determines a receiving time comprising the receiver local time when said symbol of the synchronization frame was received at the physical layer of the receiver. Time synchronizing is performed by determining a difference between said timestamp and said receiving time, and adjusting the receiver local time based on said difference to time synchronize the receiver with the transmitter.

55 Claims, 8 Drawing Sheets

(56) References Cited

U.S. PATENT DOCUMENTS

| | | | |
|---|---|---|---|
| 7,191,354 B2 | 3/2007 | Purho | |
| 7,409,022 B2 | 8/2008 | Dai et al. | |
| 7,567,544 B2 | 7/2009 | Myles et al. | |
| 7,848,362 B2 | 12/2010 | Picard | |
| 2002/0172188 A1* | 11/2002 | Wunsch | H04L 5/1453 370/351 |
| 2006/0088063 A1* | 4/2006 | Hartung et al. | 370/498 |
| 2007/0153725 A1* | 7/2007 | Waxman | 370/329 |
| 2007/0218870 A1 | 9/2007 | Satoh | |
| 2008/0273521 A1* | 11/2008 | Shao et al. | 370/350 |
| 2009/0046593 A1* | 2/2009 | Ptasinski et al. | 370/252 |
| 2009/0052429 A1 | 2/2009 | Pratt, Jr. et al. | |
| 2009/0135854 A1 | 5/2009 | Bettin et al. | |
| 2009/0161653 A1 | 6/2009 | Kumar et al. | |
| 2010/0014463 A1* | 1/2010 | Nagai et al. | 370/328 |
| 2010/0040369 A1* | 2/2010 | Zhao et al. | 398/58 |
| 2010/0278062 A1* | 11/2010 | Abraham et al. | 370/252 |

FOREIGN PATENT DOCUMENTS

| | | | |
|---|---|---|---|
| JP | 2009049694 A | 3/2009 | |
| JP | 2010541298 A | 12/2010 | |
| WO | 2008033514 A1 | 3/2008 | |

OTHER PUBLICATIONS

IEEE Computer Society, "IEEE Std 802.11™-2007 (Revision of IEEE Std 802.11-1999), IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.

Cordeiro, C. et al., "IEEE P802.11 Wireless LANs, PHY/MAC Complete Proposal Specification (IEEE 802.11-10/0433r2)", IEEE, May 18, 2010, pp. 1-335, United States.

IEEE Computer Society, "IEEE P802.11v™/D15.0 Draft Standard for Information technology—Telecommunications and information exchange between systems—Local and metropolitan area networks—Specific requirements—Part 11: Wireless LAN Medium Access Control (MAC) and Physical Layer (PHY) specifications, Amendment 8: IEEE 802.11 Wireless Network Management", IEEE, Sep. 2010, pp. i-407, New York, United States.

Wireless Gigabit (WIGIG) Alliance, "WiGig White Paper, Defining the Future of Multi-Gigabit Wireless Communications", WiGig Alliance, Jul. 2010, pp. 1-5, United States.

IEEE Computer Society, "IEEE P802.11v™/D8.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, Amendment 8: IEEE 802.11 Wireless Network Management," Jan. 2010, pp. i-349, IEEE, New York, United States.

Australian Examination Report No. 1 dated Sep. 24, 2013 for Australian Application No. 2011221736 from Australian Government, IP Australia, pp. 1-3, Woden ACT, Australia.

Russian Office Action dated Dec. 11, 2013 for Russian Application No. 2012137780 from Russian Federal Service for Intellectual Property (Rospatent), pp. 1-5, Moscow, Russia (English-language translation attached, pp. 1-2).

Canadian Office Action dated May 14, 2014 for Canadian Application No. 2791698 from Canadian Intellectual Property Office, pp. 1-9, Gatineau, Quebec, Canada.

Australian Notice of Acceptance Dec. 16, 2014 for Australian Application No. 2011221736 from Australian Government, IP Australia, pp. 1-2, Woden ACT, Australia.

Canadian Office Action dated Nov. 20, 2014 for Canadian Application No. 2791698 from Canadian Intellectual Property Office, pp. 1-10, Gatineau, Quebec, Canada.

Japanese Office Action dated Dec. 2, 2014 for Japanese Application No. 2012-556020 from Japan Patent Office, pp. 1-4, Tokyo, Japan (English-language translation attached, pp. 3-4).

Ganesh, V. et al., "Normative Text for D3.02 Timing Measurement", Nov. 11, 2008, pp. 1-25, IEEE 802.11-08/1229r2, Japan.

Australian Examination Report No. 2 dated Oct. 23, 2014 for Australian Application No. 2011221736 from Australian Government, IP Australia, pp. 1-3, Woden ACT, Australia.

Chinese Office Action dated Sep. 22, 2014 for Chinese Application No. 201180012546.3 from the State Intellectual Property Office of P.R. China, pp. 1-19, Beijing, China (English-language translation attached, pp. 8-19).

Chinese Office Action mailed Jun. 3, 2015 for Chinese Application No. 201180012546.3 from The State Intellectual Property Office of P.R. China, pp. 1-22, China (English-language translation included, pp. 1-14).

Wang, X. et al., "Research and application of IEEE1588 precision time protocol", Computer Engineering and Design, Aug. 31, 2009, pp. 1846-1849, vol. 30, Issue8, IEEE, China.

Japanese Office Action mailed Jul. 28, 2015 for Japanese Application No. 2012-556020 from Japan Office Action, pp. 1-4, Tokyo, Japan.

Venkatesan, G. et al., "Normative Text for D3.02 Timing Measurement", IEEE, Nov. 11, 2008, pp. 1-27, IEEE 802.11-08-1229r2, United States.

IEEE, "IEEE Wireless LAN Edition: A compilation based on IEEE Std 802.11 ™-1999 (R2003) and its amendments," 2003, pp. 1-678, IEEE, New York, United States.

IEEE Computer Society, "IEEE P802.11e/D13.0, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) specifications: Amendment: Medium Access Control (MAC) Quality of Service (QoS) Enhancements," Jan. 2005, pp. i-182, IEEE, New York, United States.

Mills, D.L., "Internet Time Synchronization: the Network Time Protocol," IEEE Transactions on Communications, Oct. 1991, pp. 1482-1493, vol. 39, No. 10, IEEE Computer Society Press, United States.

Mills, D., "Simple Network Time Protocol (SNTP) Version 4 for IPv4, IPv6 and OSI," Network Working Group, University of Delaware, Oct. 1996, pp. 1-17, United States.

U.S. Non-Final Office Action for U.S. Appl. No. 11/800,392 mailed on Jul. 22, 2010.

U.S. Non-Final Office Action for U.S. Appl. No. 11/800,392 mailed on Jan. 5, 2011.

U.S. Notice of Allowance for U.S. Appl. No. 11/800,392 mailed on May 26, 2011.

U.S. Non-Final Office Action for U.S. Appl. No. 10/209,294 mailed on Oct. 28, 2011.

U.S. Final Office Action for U.S. Appl. No. 13/209,294 mailed Mar. 12, 2012.

U.S. Advisory Action for U.S. Appl. No, 13/209,294 mailed May 10, 2012.

U.S. Notice of Allowance for U.S. Appl. No. 13/209,294 mailed Jun. 13, 2012.

Extended Europrean Search Report dated Mar. 16, 2016 for European Application No. 11750927.3 from European Patent Office, pp. 1-7, Munich, Germany.

Canadian Office Action dated Jan. 25, 2016 for Canadian Application No. 2791698 from Canadian Intellectual Property Office, pp. 1-10, Gatineau, Quebec, Canada.

* cited by examiner

METHOD AND SYSTEM FOR ACCURATE CLOCK SYNCHRONIZATION THROUGH INTERACTION BETWEEN COMMUNICATION LAYERS AND SUB-LAYERS FOR COMMUNICATION SYSTEMS

CROSS-REFERENCE TO RELATED APPLICATIONS

This application claims priority to U.S. Provisional Patent Application Ser. No. 61/311,136, filed Mar. 5, 2010, incorporated herein by reference. This application further claims priority to U.S. Provisional Patent Application Ser. No. 61/312,628, filed Mar. 10, 2010, incorporated herein by reference.

FIELD OF THE INVENTION

The present invention relates to clock synchronization between communication devices, and in particular, relates to accurate clock synchronization for devices communicating in wireless networks.

BACKGROUND OF THE INVENTION

IEEE 802.11 wireless communication protocol specifications for wireless networks define a time synchronization scheme for wireless stations in a wireless network. An access point (AP) wireless station can read a system clock when generating a beacon and place timestamp information into the beacon frame.

BRIEF SUMMARY OF THE INVENTION

Embodiments of the present invention provide a method and system for high accuracy clock synchronization protocol for communication between devices in a communication system such as a wireless communication system comprising a wireless network. Embodiments of the invention provide accurate clock synchronization through interaction between communication layers and sub-layers for wireless communication networks.

In one embodiment, the present invention provides a process for time synchronization in a wireless communication system, comprising transmitting a synchronization frame from a wireless transmitter to a wireless receiver over a wireless communication medium, wherein the synchronization frame includes a timestamp comprising a transmitting time indicating the transmitter local time when a symbol at a predefined position of the synchronization frame is placed on the wireless communication medium for transmission. The process further includes receiving the synchronization frame at a physical layer of the receiver, and determining a receiving time comprising the receiver local time when said symbol of the synchronization frame was received from the wireless communication medium at the physical layer of the receiver. The process further includes providing the received synchronization frame to a higher communication layer at the receiver, wherein the synchronization frame arrives at said higher communication layer at an arriving time indicating a receiver local time at which the synchronization frame arrived at said higher layer. The process further includes time synchronizing the receiver with the transmitter by determining a difference between said timestamp and said receiving time, and adjusting the receiver local time with said difference to time synchronize the receiver with the transmitter.

These and other features, aspects and advantages of the present invention will become understood with reference to the following description, appended claims and accompanying figures.

DETAILED DESCRIPTION OF THE INVENTION

The present invention provides a high accuracy clock synchronization protocol for communication between devices in a communication system such as wireless communication system comprising a wireless network. Embodiments of the invention provide accurate clock synchronization through interaction between communication layers and sub-layers for wireless communication networks.

Figure 1:
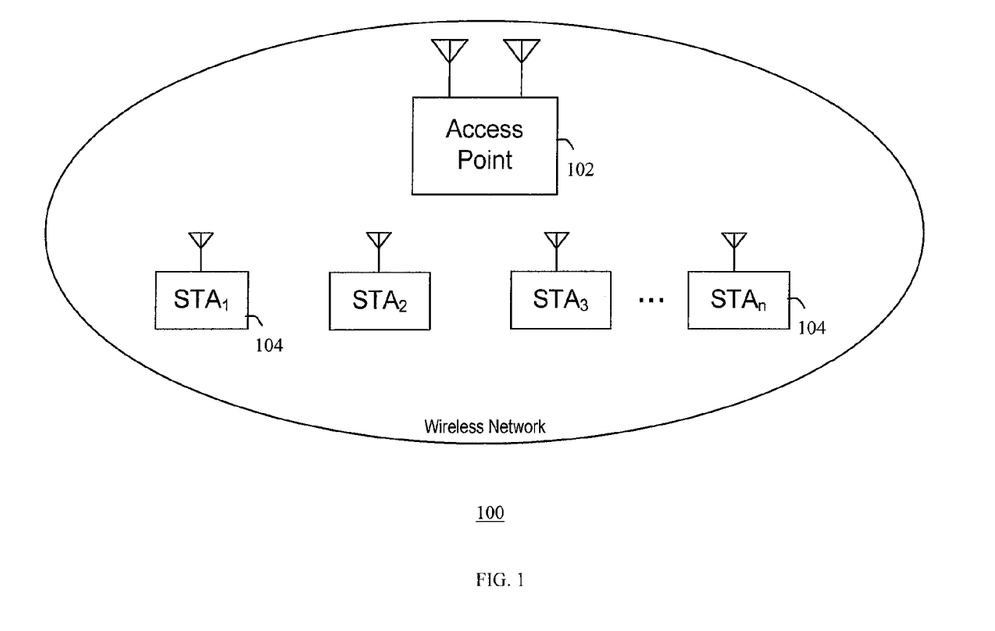
FIG. 1 shows a block diagram of a wireless communication system implementing time synchronization, according to an embodiment of the invention.

FIG. 1 shows a block diagram of an example wireless local area network 100 (such as WLAN according to IEEE 802.11 standards), comprising multiple wireless stations including an AP 102 that functions as a coordinator, and other stations (STAs) 104 such as STA1, . . . , STAn, wherein the network 100 is enhanced to implement time synchronization according to an embodiment of the present invention, as described herein. The wireless stations perform wireless communication over a communication link such as a wireless communication medium (e.g., radio frequency (RF) channel). The network 100 implements accurate clock synchronization among a plurality of the wireless stations through interaction between communication layers and sub-layers for wireless communication, according to an embodiment of the invention.

According to an embodiment of the invention, the AP 102 and the STAs 104 implement a frame structure for data transmission therebetween, using packet transmission via communication layers including a Data Link Layer comprising a MAC layer, and a PHY layer, such as specified in the Open Systems Interconnection model (OSI model). In a wireless station, the MAC layer receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the wireless station such as the AP to attach a PHY header (i.e., a PHY preamble) thereto to construct a PHY Protocol Data Unit (PPDU). The PHY header includes parameters for determining a transmission scheme including a coding/modulation scheme. Before transmission as a packet from the AP to a STA, a preamble is attached to the PPDU, which includes channel estimation and synchronization information.

Figure 2:
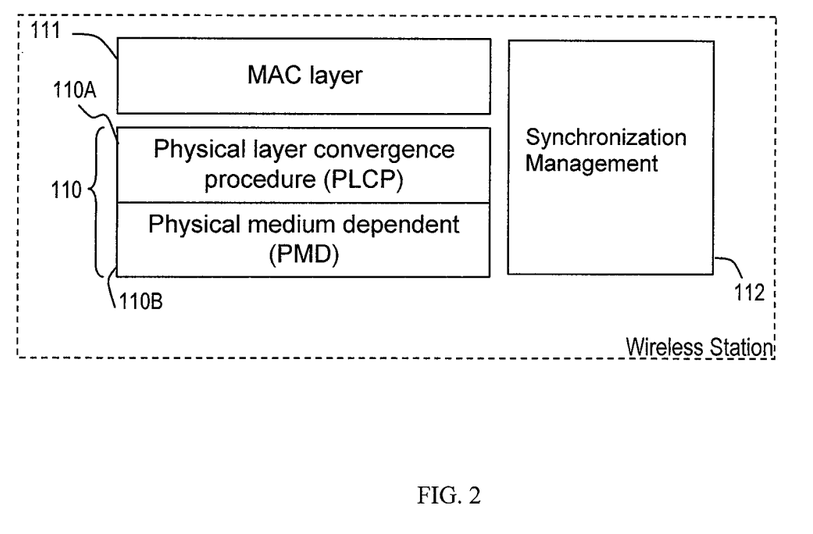
FIG. 2 shows a block diagram of a physical (PHY) communication layer and a media access control (MAC) communication layer in a wireless station which implements clock synchronization in a wireless communication system comprising a wireless local area network, according to embodiments of the present invention.

FIG. 2 shows an example block diagram of a PHY layer 110 and a MAC layer 111 in a wireless station which implements clock synchronization using a synchronization management module 112, according to embodiments of the present invention. The PHY layer includes a PLCP sub-layer 110A, and a PMD sub-layer 110B.

In one implementation, the invention allows determining or estimating the delay at different communication layers (e.g., MAC layer 111, PHY layer 110), and also the delay due to the information passing between communication layers, in a wireless station. For example, an implementation of the invention provides high accuracy time synchronization at MAC/PHY layers by focusing on the cross-layer/sub-layer interactions, as described further below.

According to an embodiment of the invention, time synchronization is achieved using synchronization signals (such as broadcast beacons) over a wireless channel, directly at the PHY/MAC layers of a transmitting wireless station (e.g., an AP 102) and a receiver station (e.g., a STA 104) in a wireless local area network, to minimize synchronization delay jitter. When a receiving station receives a beacon with a timestamp from a transmitting station, the synchronization management module 112 of the receiving station adjusts the timestamp value based on the delay time at the PHY layer 110 and also the delay between PHY layer 110 and MAC layer 111 at the receiving station. Then, the receiving station can set its system clock (local time) to the adjusted value of the timestamp in the beacon to synchronize with the system clock of the transmitting station (e.g., the AP).

Timing related parameters are passed between communication layers or sub-layers to support accurate time synchronization according to embodiments of the invention. The invention also provides timing related parameter passing mechanisms between the MAC layer 111 and PLCP sub-layer 110A, and also between PLCP sub-layer 110A and PMD sub-layer 110B. As such, the invention allows recording time at different communication layers/sub-layers and passing the parameters between communication layers and sub-layers.

Figure 3A:
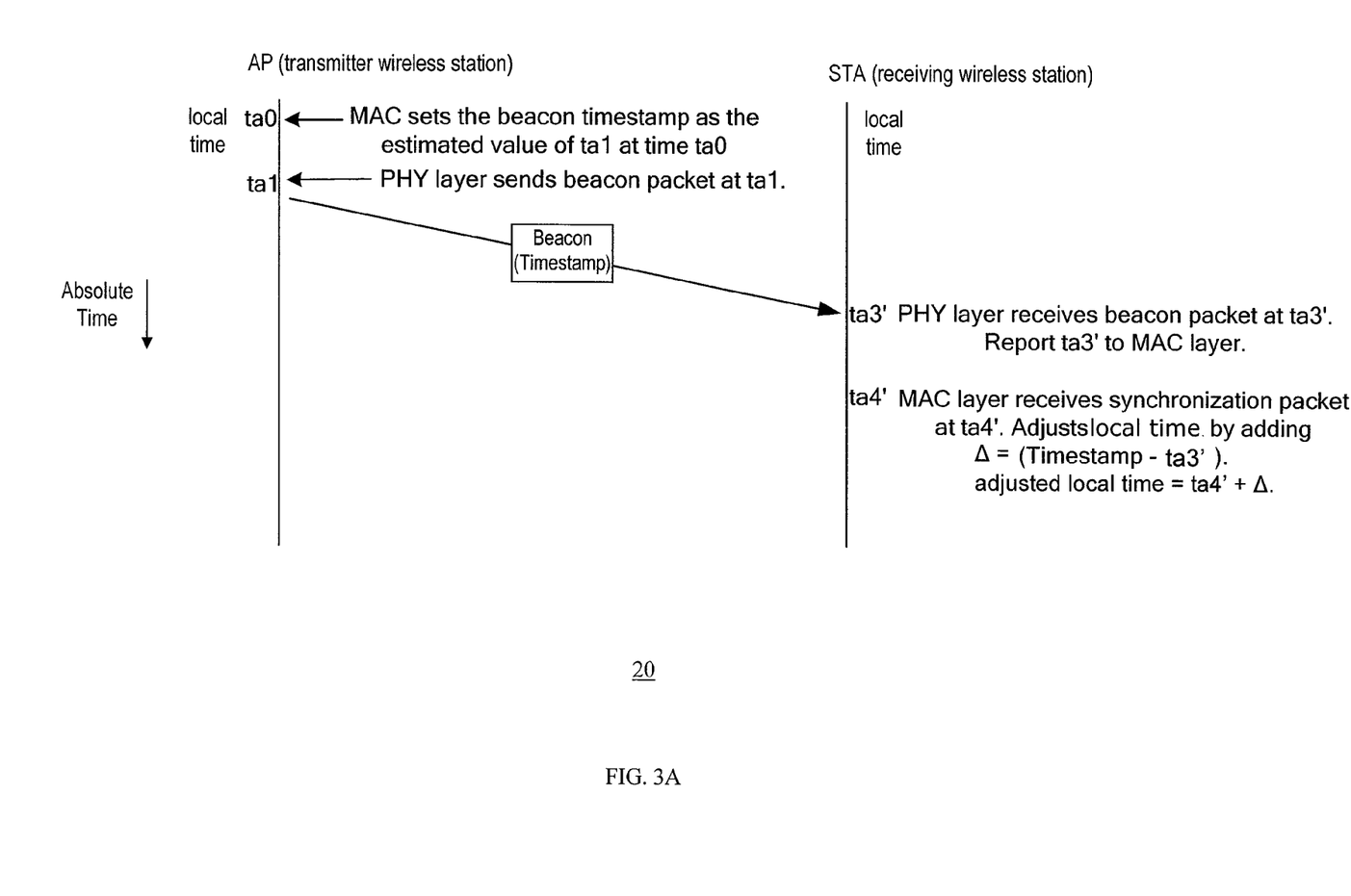
FIG. 3A shows an example timing diagram and process flow wherein an access point transmits a synchronization packet comprising a beacon frame including a timestamp to a receiving station in a wireless local area network (WLAN), according to an embodiment of the invention.

FIG. 3A illustrates an example timing diagram and process flow 20, wherein the AP transmits a synchronization packet comprising a beacon frame including a timestamp, to a receiving STA. The receiving STA adjusts the timestamp value of the beacon frame by adding a processing delay at the PHY layer of the receiving STA and also a passing delay between PHY and MAC layers of the receiving STA as at least a portion of the received frame is processed and traverses from the PHY layer to the MAC layer of the wireless station.

The transmitting station has a system clock set to a local time, and the receiving station has a system clock set to a local time, wherein the local time at the receiving station need not initially be synchronized with the local time at the transmitting station. An example scenario and procedure for synchronizing the local time at the receiving station to the local time at the transmitting station is as follows, according to an embodiment of the present invention. The local time ta0 is the time when a whole packet is built in the MAC layer of the transmitting station, which in this example is the AP. The time ta1 is the time when the symbol at a predefined position of the packet is placed on the wireless channel by the PHY layer of the AP. The time ta3' is the time when the symbol at the predefined position of the packet is received from the wireless channel by the PHY layer of a receiving STA. The time ta4' is the time when the received packet passes the PHY layer of the STA and reaches the MAC layer of the STA.

As there is clock drift, local clock/time readings are different at the AP 102 and at the STA 104. At local time ta0, the MAC layer of the AP sets a beacon timestamp (i.e., Timestamp) as local time ta1 when a symbol at a predefined position in the beacon frame will be placed on the wireless channel by the PHY layer of the AP. In one embodiment, the timestamp (ta1) comprises an estimated local time when a symbol of the beacon frame at a predefined position in the beacon frame will be placed on the wireless channel by the PHY layer of the AP (e.g., average delay duration between ta0 and ta1). In another embodiment, the timestamp (ta1) is determined based on timing primitives, such as described further below in relation to FIGS. 5-7.

Propagation delay is the propagation time of a bit in the wireless channel (e.g., a radio frequency transmission channel), in transmitting a packet (e.g., beacon) from the AP to the STA. The propagation delay is generally negligible relative to a beacon interval, and is a function of the physical distance between the STA and the AP. Thus, the propagation delay varies for different STAs which are at different distances from the AP. However, once the positions of the STAs relative to the AP are fixed, the corresponding propagation delays are constant values. Propagation delay is small and relatively easy to calculate compared with processing delay. For example, if the distance between an AP and a STA is less than 100 meters, the propagation delay is less than $100/(3*10^8)=333.3$ ns. In one example, wherein beacons are used as synchronization packets, the beacon interval indicates the interval between synchronization packets.

Processing delay includes processing delay at the AP (i.e., access delay) and processing delay at the STA (i.e., receive delay). Processing delay at the AP comprises the time for a bit to pass from the AP MAC layer through the AP PHY layer to the wireless channel. Thus, to minimize processing delay at the AP, the packet timestamp should be as close as possible to time ta1 when the symbol at the predefined position is placed on the wireless channel.

Processing delay at the STA comprises the time needed for the symbol at the predefined position in a packet received from the wireless channel, to be processed at the STA PHY layer, to reach the STA MAC layer. In the example shown in FIG. 3A, the processing delay at the STA comprises the difference between ta3' and ta4'. Thus, to minimize the processing delay at the STA, the time ta4' at the STA MAC layer should be as close as possible to the time to ta3' when the symbol at the predefined position is received at the STA PHY layer from the wireless channel.

At the receiving STA, the PHY layer receives the beacon packet at local time ta3', wherein the PHY layer reports the receiving time ta3' to the MAC layer at the receiving STA. At local time ta4', the MAC layer of the receiver STA receives the synchronization packet from the PHY layer of the receiver station (i.e., the STA MAC layer receives the symbol at the predefined position of the received frame, from the STA PHY layer at time ta4').

The synchronization management module of the receiving STA then determines a difference $\Delta$ between the beacon timestamp and ta3', wherein:

$$\Delta = \text{Timestamp} - ta3'.$$

The difference $\Delta$ (a signed number) is then added to the local time ta4' to determine an adjusted local time S as:

$$S = ta4' + \Delta.$$

The system clock at the receiving station representing the local time is set to the adjusted local time S. As such, the system clock at the receiving station is synchronized with the system clock at the transmitting station.

Figure 3B:
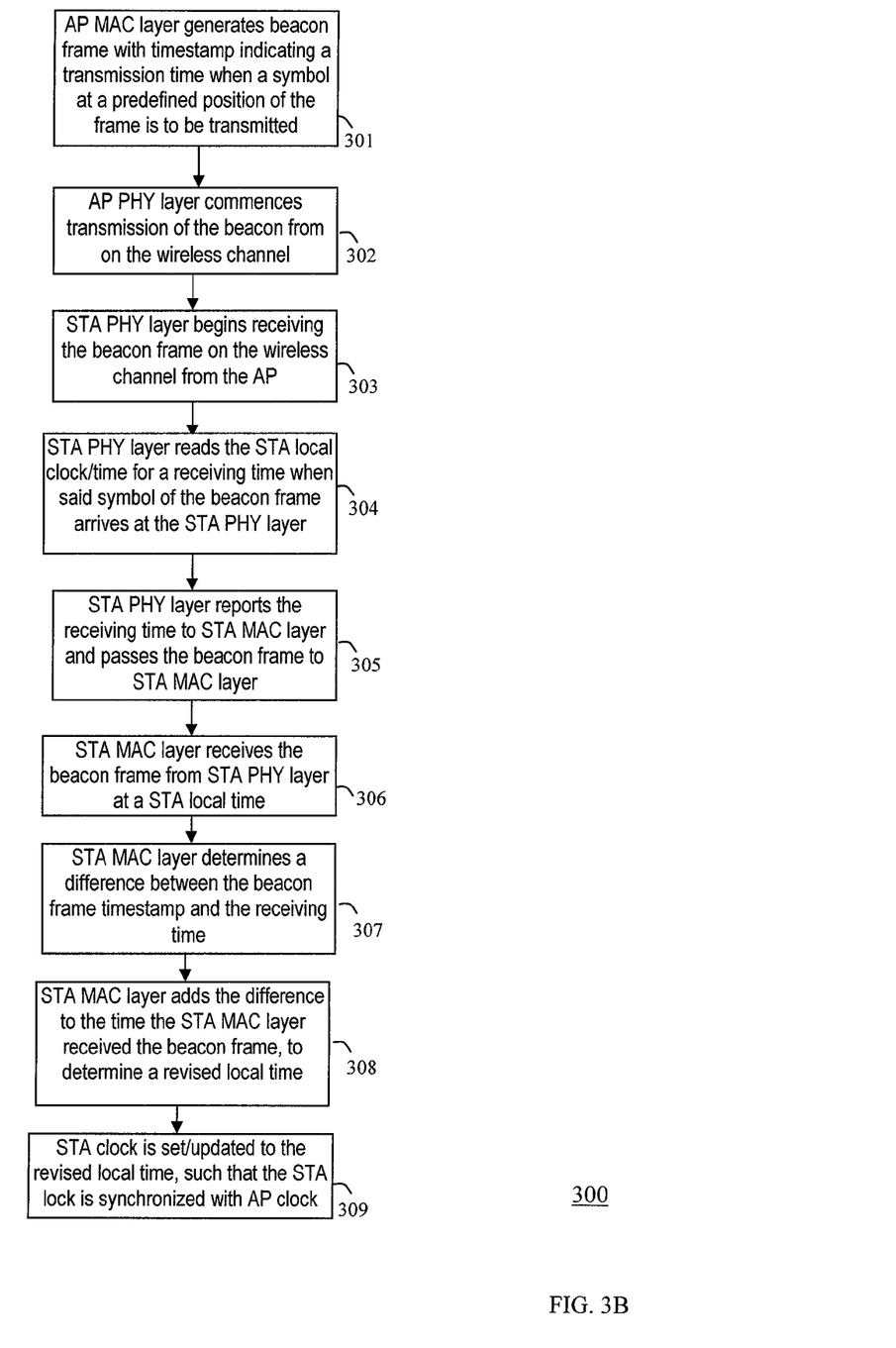
FIG. 3B shows a flowchart of a process for time synchronization process according to an embodiment of the present invention.

Referring to the flowchart in FIG. 3B, an implementation of a high accuracy time synchronization process 300 according to an embodiment of the present invention comprises the following process blocks:

Block 301: The AP MAC layer generates a synchronization packet comprising a beacon frame, and sets beacon frame timestamp indicating an AP local time for transmission time (e.g., ta1) when a symbol at a predefined position in the beacon frame will be placed on the wireless channel by the PHY layer of the AP.

Block 302: The AP PHY layer commences transmission of the beacon on the wireless channel.

Block 303: The STA PHY layer begins receiving the beacon frame on the wireless channel from the AP.

Block 304: The STA PHY layer reads the STA local clock/time for receiving time (e.g., ta3') when the symbol at the predefined position of the beacon frame arrives at the STA PHY layer.

Block 305: The STA PHY layer reports the receiving time to the STA MAC layer and passes the beacon frame to the STA MAC layer.

Block 306: The STA MAC layer receives the beacon frame from the STA PHY layer, wherein the beacon frame arrives at the STA MAC layer at STA local arriving time (e.g., ta4').

Block 307: The STA MAC layer determines the difference (e.g., $\Delta$) between the beacon frame timestamp and the receiving time (e.g., ta3').

Block 308: The STA MAC layer adds said difference (a signed number) to said arriving time (e.g., ta4') to determine a revised local time.

Block 309: The STA clock is set to the revised local time, such that the STA lock is synchronized with the AP clock.

If the distance between the AP and the STA can be estimated to determine the propagation delay, the STA can further adjust its clock (timer) by subtracting the propagation delay from said revised local time.

An example application of an embodiment of the synchronization process described above is described hereinbelow for millimeter wave wireless communication standards such as IEEE 802.11ad specification over the 60 GHz frequency band, and Wireless Gigabit Alliance (WiGig) specification. WiGig applies to multi-gigabit speed wireless communications technology operating over the 60 GHz radio frequency band. WiGig is an industry-led effort to define a wireless digital network interface specification for wireless signal transmission on the 60 GHz frequency band and higher for wireless local area networks and wireless local area network devices such as consumer electronics (CE) and other electronic devices including wireless radios.

According to the IEEE 802.11 protocol specification family, the MAC layer provides primitives and an interface for a higher layer to perform timing calculations. This is accomplished by indicating the occurrence of the end of the last symbol of a particular data frame to the higher layer, wherein the higher layer records a timestamp and sends the timestamp through the higher layer data packets. Embodiments of the invention provide enhancements to the IEEE 802.11 protocol specification (such as IEEE 802.11ad standard), wherein such enhancements as described herein in relation to embodiments of the invention, include processes and architectures for time synchronization between a transmitting station and a receiving station such that artifacts such as delay jitter caused by interaction between the higher layer and the MAC layer, and between the MAC layer and the PHY layer is minimized.

Figure 4:
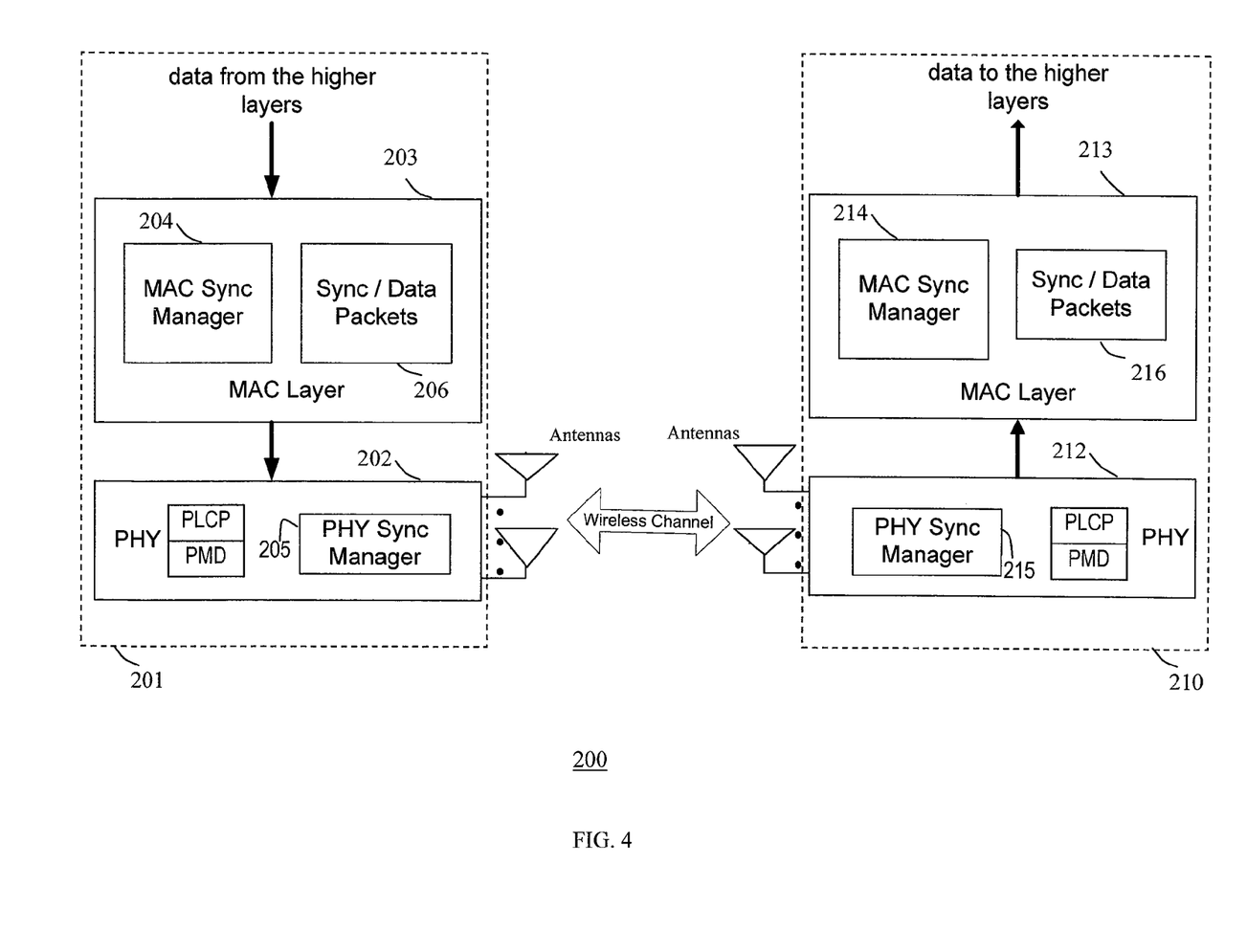
FIG. 4 shows a block diagram of a wireless local area network comprising a transmitter wireless station and a receiver wireless station, implementing time synchronization, according to an embodiment of the invention.

FIG. 4 shows an example block diagram of a wireless local area network 200 comprising a transmitter wireless station 201 and a receiver wireless station 210, according to an embodiment of the invention. Each of the stations 201 and 210 is an example implementation of the wireless station illustrated in FIG. 2 and described above, according to an embodiment of the invention. As shown in FIG. 4, the transmitter station 201 includes a PHY layer 202, and a MAC layer 203. The transmitter station 201 implements clock synchronization using a MAC synchronization manager module 204 and a PHY synchronization manager module 205, configured to operate on synchronization/data packets 206 (including timing/synchronization information), according to embodiments of the present invention. The receiver station 210 includes a PHY layer 212, and a MAC layer 213. The receiver station 210 provides clock synchronization using a MAC synchronization manager module 214 and a PHY synchronization manager module 215, configured to operate on synchronization/data packets 216, according to embodiments of the present invention. The synchronization/data packets 216 comprise synchronization/data packets 206 received from the transmitter station 201.

In one implementation, the network 200 implements a wireless communication protocol based on the IEEE 802.11 standards, and further provides time synchronization utilizing a Time Synchronization Function (TSF), according to an embodiment of the invention. The MAC layer 203 of the transmitter station 201 includes a MAC synchronization manager module 204, and the PHY layer 205 includes a PHY sync manager module 205, according to an embodiment of the invention. The MAC synchronization manager module 204 determines the actual clock reading time when information at a predefined position of a packet 206 (e.g., a beacon or other frame) is transmitted by the PMD sub-layer 110B (FIG. 2) of the PHY layer 202 of the transmitter station 201 when detected by the PHY synchronization manager module 205.

The MAC layer 213 of the receiver station 210 includes a MAC synchronization manager module 214, and the PHY layer 212 includes a PHY sync manager module 215, according to an embodiment of the invention. The MAC synchronization manager module 214 determines the actual clock reading time when a predefined position of a packet 216 (e.g., a beacon or other frame) is received by the PMD sub-layer 110B of the PHY layer 212 as detected by the PHY synchronization manager module 215.

Figure 5:
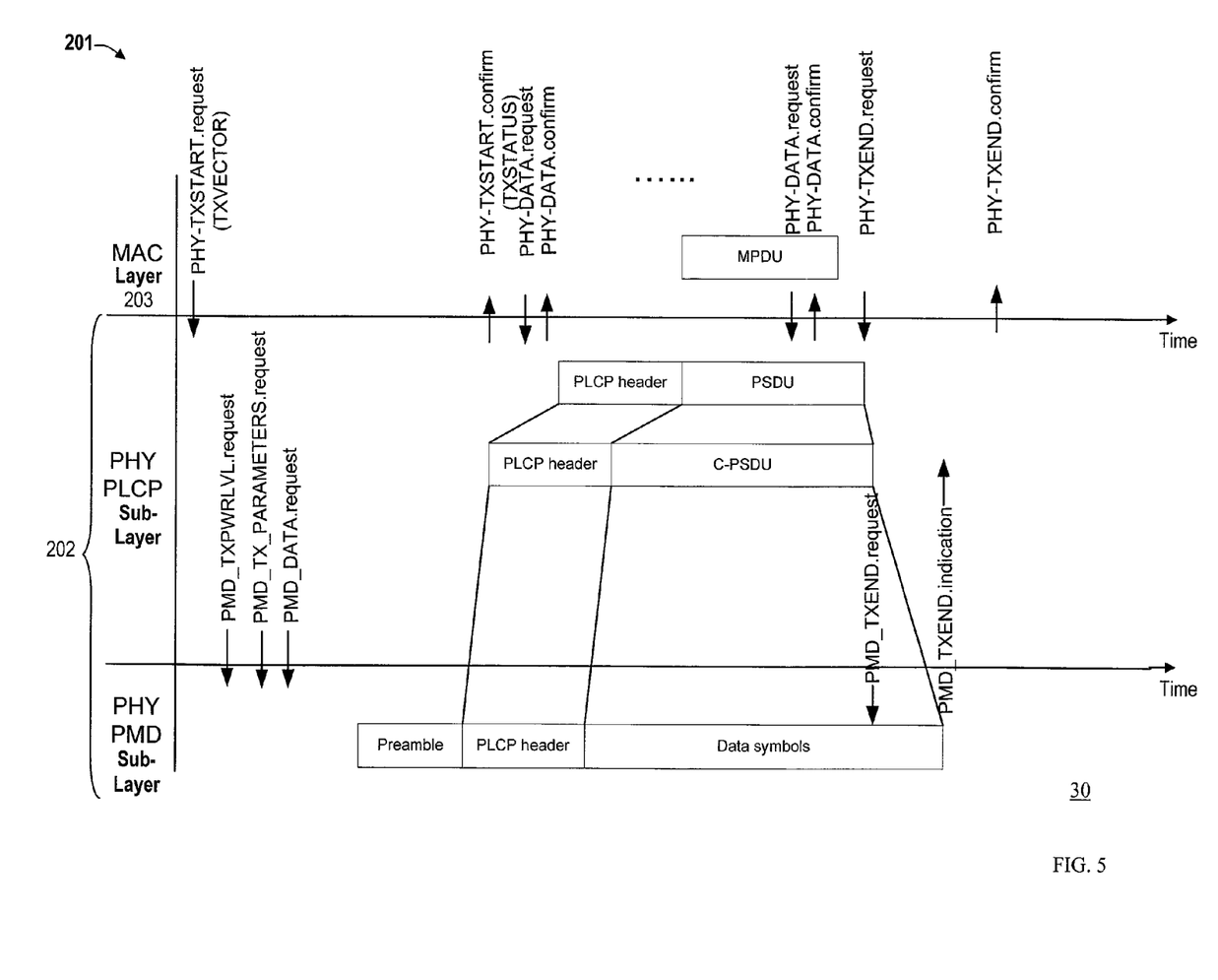
FIG. 5 shows an example process and timing diagram for the interactions between MAC layer and PHY layer convergence procedure (PLCP) sub-layer, and further between the PHY PLCP sub-layer and PHY physical medium dependent (PMD) sub-layer, of the PHY layer of the transmitter station in FIG. 4 for time synchronization, according to an embodiment of the invention.
Figure 6:
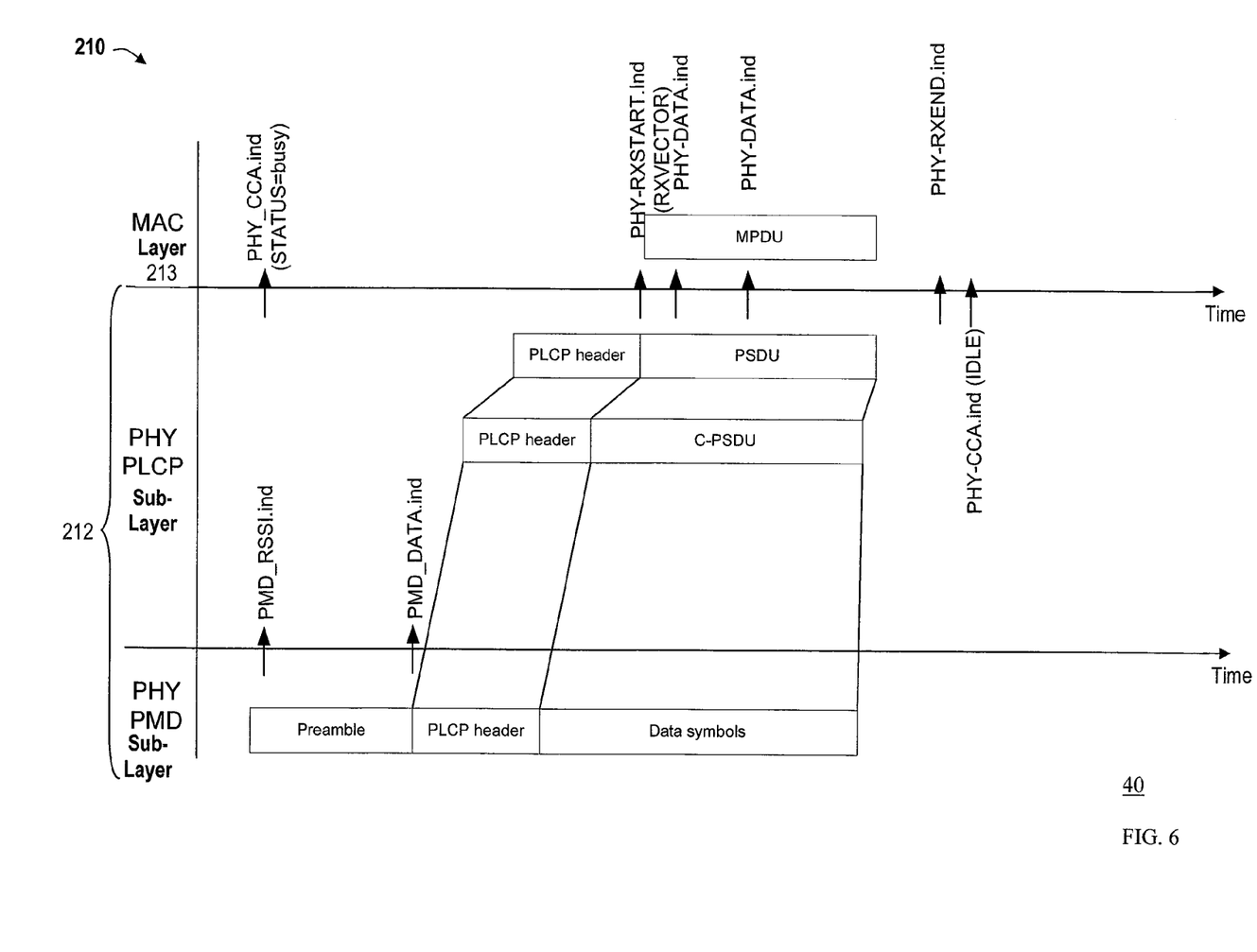
FIG. 6 illustrates an example process and timing diagram for the interactions between the MAC layer and PHY PLCP sub-layer, and also between PHY PLCP sub-layer and PHY PMD sub-layer, of the PHY layer of the receiver station in FIG. 4 for time synchronization, according to an embodiment of the invention.

In one embodiment of the invention, said predefined position is set to the starting point of the preamble of a packet/frame. FIG. 5 shows an example process and timing diagram 30 for the interactions between MAC layer and PHY PLCP sub-layer, and further between the PHY PLCP sub-layer and PHY PMD sub-layer, of the PHY layer 202 at the transmitter station 201 (e.g., the AP 102 in FIG. 1) for frame (packet) communication, according to an embodiment of the invention. FIG. 6 illustrates an example timing diagram and process 40 for the interactions between the MAC layer and PHY PLCP sub-layer, and also between PHY PLCP sub-layer and PHY PMD sub-layer, of the PHY layer 212 at the receiver station 210 (e.g., an STA 104 in FIG. 1) for frame (packet) communication, according to an embodiment of the invention. An example operation scenario according to an embodiment of the invention is described below in conjunction with FIGS. 4-6.

The MAC synchronization manager module 204 of the transmitting station 201 (FIG. 5) determines the actual clock reading as the timestamp (ta1) when said symbol at the predefined position is transmitted on the wireless channel, through a TIME_OF_DEPARTURE parameter within the TXSTATUS vector after PLCP sub-layer 110A issues the PHY_TXSTART.confirmation (TXSTATUS) primitive (i.e., PHY-TXSTART.confirm) to the MAC layer 203. The TIME_OF_DEPARTURE parameter carries the time value for the preamble starting point, to be transmitted at the PMD sub-layer 110B of the PHY layer 202 of the transmitter wireless station 201. The TXSTATUS vector represents a list of parameters that the PHY layer provides to the MAC layer related to the transmission of an MPDU. This TXSTATUS vector contains both PLCP and PHY operational parameters. The PHY_TXSTART.confirmation is a service primitive transmitted to the MAC layer by the PHY layer to start an MPDU transmission.

C-PSDU indicates a coded PSDU. Typically, the most reliable coding/modulation scheme is applied to a PHY signal field in the PHY header, and an additional cyclic redundancy check (CRC) is added to ensure this information is received correctly at the receiver. The MAC header and payload data are usually treated equally and transmitted using the same coding/modulation scheme, which is less robust than that for the PHY signal field of the PHY header.

The MAC synchronization manager module 214 of the MAC layer 213 of the receiver station 210 (FIG. 6) obtains the estimated time that the transmitted frame preamble started to be received at PHY layer 212 of the receiver station 210 using the RX_START_OF_FRAME_OFFSET parameter within RXVECTOR after the PLCP sub-layer of the PHY layer 212 issues the PHY_RXSTART.indication (RXVECTOR) primitive (i.e., PHY-RXSTART.Ind) to the MAC layer 213.

The RX_START_OF_FRAME_OFFSET parameter carries the estimated time offset (in 10 nanosecond units) from the point in time at which the start of the preamble corresponding to the incoming frame (packet) arrived at the receiver station 210 PHY layer (e.g., antenna port), to the point in time at which PHY_RXSTART.indication primitive is issued to the MAC layer 213. Therefore, the time when the receiver MAC layer 213 obtains the PHY_RXSTART.indication (RXVECTOR) primitive less the RX_START_OF_FRAME_OFFSET, provides the estimated preamble starting receive time at the receiver station 210.

PHY_RXSTART.indication is an indication by the PHY layer to the MAC layer that the PLCP has received a valid start frame delimiter (SFD) and PLCP Header. The primitive provides PHY-RXSTART.indication (RXVECTOR). The RXVECTOR vector represents a list of parameters that the PHY provides the MAC layer upon receipt of a valid PLCP header or upon receipt of the last PSDU data bit in the received frame. The RXVECTOR vector contains both MAC and MAC management parameters.

In an example implementation for a millimeter wave (mmW or mmWave) wireless communication standard, a synchronization mechanism according to an embodiment of the invention is as follows. The transmitter station 201 transmitting an mmWave packet such as a Beacon frame, or an Announce frame, sets the value of the frame timestamp field so that it equals the value of the transmitter TSF timer at the time transmission of the frame preamble from the PHY layer 202 of the wireless station 201 onto the wireless channel commences. The value of the frame timestamp field includes any transmitting station delays while at least a portion of the frame traverses through the station local PHY layer 202 from the MAC-PHY interface to the interface with the wireless channel, at transmitter station 201.

At the wireless receiver station 210, operating in the mmWave band, the timestamp value of the received frame is obtained and adjusted by adding an amount equal to the delay at the receiving station 210 as at least a portion of the received frame traverses through the local PHY layer 212 plus the time since the preamble started to be received at the PHY layer 212 as estimated by RX_START_OF_FRAME_OFFSET.

According to another embodiment of the invention, said predefined position in a frame transmitted from the transmitting station 201 to the receiving station 210 is set to the starting point of the PLCP header. The MAC synchronization manager module 204 of the MAC layer 203 of the transmitter station 201 obtains the actual clock reading time since the PHY_TXSTART.confirmation (i.e., PHY-TXSTART.confirm) is issued to the MAC layer 203 at the start of the PLCP header.

At the receiver station 210, PMD_DATA.ind (i.e., PM_DATA.indication) is issued from PMD sub-layer to PLCP sub-layer of the PHY layer 212, at the beginning of the PLCP header, wherein the PHY synchronization manager module 215 of the PLCP sub-layer of the receiver station 210 determines when the beginning of the PLCP header is received at the PMD sub-layer of the PHY layer 212. The PHY_RXSTART.indication (RXVECTOR) is issued to the MAC layer 213 at the end of PLCP header. PMD_DATA.ind informs the PLCP that a Preamble is successfully detected at PMD sub-layer and data (PLCP header) will start to pass from PMD sub-layer to the PLCP sub-layer.

According to an aspect of the invention, a RX_START_TIME_OF_PLCP_HEADER parameter is added to the RXVECTOR to record the time when the PMD_DATA.ind is issued to the PLCP sub-layer of the PHY layer 212 of the receiving station 210. The RX_START_TIME_OF_PLCP_HEADER parameter carries the time value indicating the time that the beginning of the PLCP header is received at the PMD sub-layer of the PHY layer 212 of the receiver station 210.

According to another embodiment of the invention, for a millimeter wave wireless communication standard, utilizing a synchronization mechanism according to an embodiment of the invention, the transmitter wireless station 201 transmitting a mmWave packet such as a Beacon frame, or an Announce frame, sets the value of the frame timestamp field so that it equals the value of the transmitter TSF timer at the time transmission of the first data symbol of the PLCP header of the frame is transmitted onto the wireless channel, commences. The value of the timestamp includes any transmitting station delays while at least a portion of the frame traverses through the station local PHY layer 202 from the MAC-PHY interface to its interface with the wireless channel, at transmitter station 201.

At the wireless receiver station 210, operating in the mmWave band, the timestamp value of the received frame is obtained and adjusted by adding an amount equal to the delay of the receiving station through as at least a portion of the received frame traverses the local PHY layer 212 plus the time since the first data symbol of the PLCP header was received at the PHY layer 212 as indicated by RX_START_TIME_OF_PLCP_HEADER.

Figure 7:
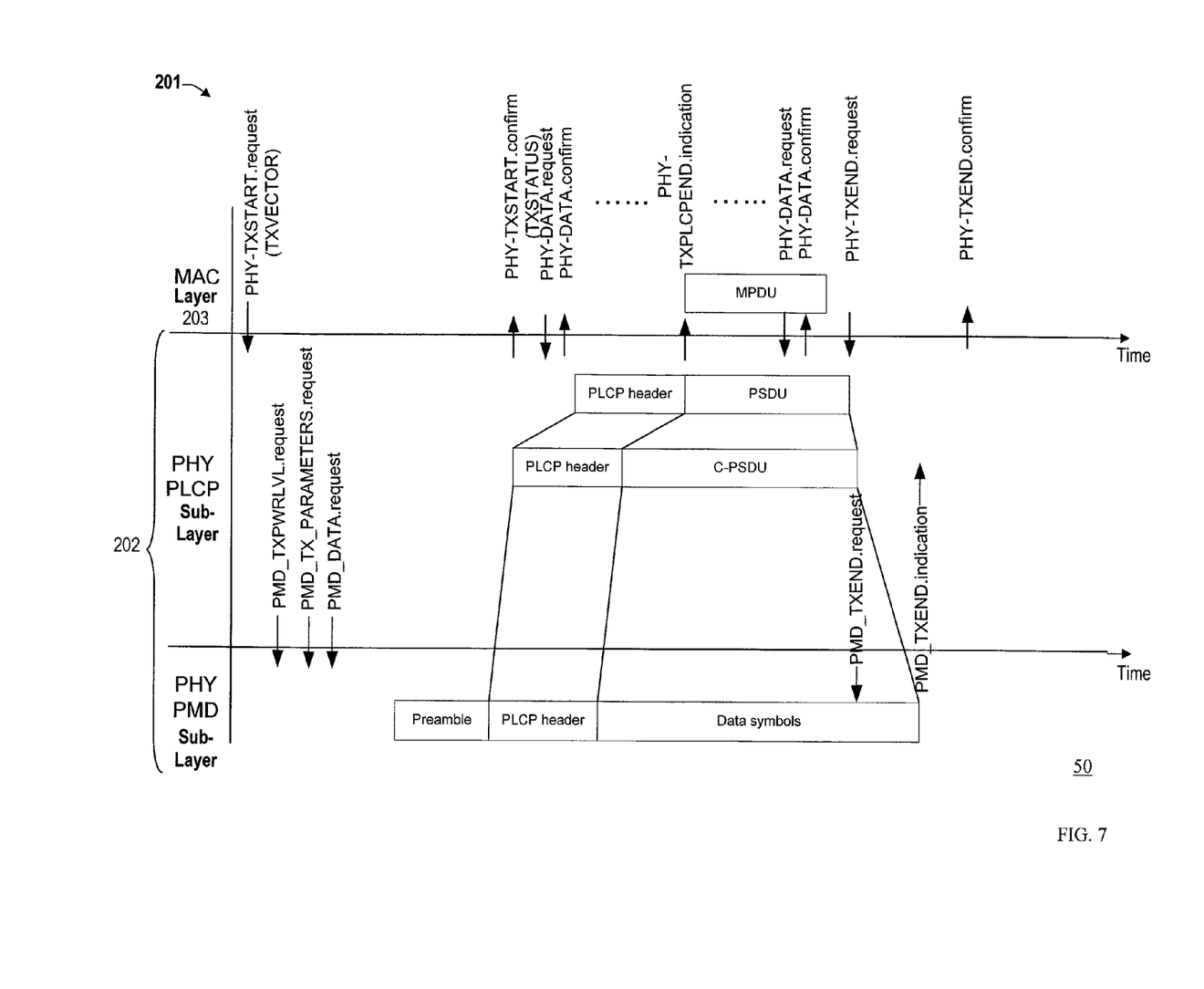
FIG. 7 illustrates an example process and timing diagram for the interactions between the MAC layer and PHY PLCP sub-layer, and also between PHY PLCP sub-layer and PHY PMD sub-layer, of the PHY layer of the transmitter station in FIG. 4 for time synchronization, according to an embodiment of the invention.

Referring to the example timing diagram and process 50 at the transmitter station 201 in FIG. 7, according to another embodiment of the invention, said predefined position in a frame transmitted from the transmitting station 201 to the receiving station 210 is set to the ending point of the PLCP header of a packet/frame. Specifically, FIG. 7 shows an example interaction between MAC-PLCP-PMD layers/sublayers at transmitter station 201 based on PHY_TXPLCPEND.indication primitive provided according to an embodiment of the invention.

The PHY_TXPLCPEND.indication primitive (i.e., PHY-TXPLCPEND.indication) comprises a signaling to the transmitter MAC layer, informing that transmission of the PLCP header on the wireless channel is complete, wherein the MAC layer can record the time when PHY_TXPLCPEND.indication is obtained as timestamp (ta1), according to an embodiment of the invention.

At the transmitter station 201, this allows obtaining the time directly using the PHY_TXPLCPEND.indication primitive which is issued to the MAC layer 203 when the transmission of PLCP header is completed at the PHY layer 202. The MAC layer 203 of the transmitter station 201 obtains the clock (local time) when transmission of the PLCP header is completed at the PHY layer 202, by recording the time when the PHY_TXPLCPEND.indication primitive is received from the PLCP sub-layer of the PHY layer 202. At the receiver station 210, the MAC layer 213 obtains the actual local time (ta3') based on PHY_RXSTART.indication, wherein the PHY_RXSTART.indication is issued to the MAC layer 213 at the end of the PLCP header (FIG. 6).

According to an embodiment of the invention, to define PHY-TXPLCPEND.indication, the following additions (enhancements) in Table 1 are provided for the IEEE 802.11 specification:

TABLE 1

Additions to sub-clause 12.3.5 of the
IEEE Std. 802.11-2007, "IEEE Standard for Information
technology-Telecommunications and information exchange
between systems-Local and metropolitan area networks-
Specific requirements, Part 11: Wireless LAN Medium Access
Control (MAC) and Physical Layer (PHY) Specifications," IEEE
Computer Society, Jun. 12, 2007:

PHY-TXPLCPEND.indication
   Function - this primitive indicates the transmission completion
of the PLCP header to the local MAC entity.
     Semantics of the service primitive - the semantics of the primitive
     are as follows:
     PHY-TXPLCPEND.indication
     This primitive has no parameters.
     When generated - the PHY-TXPLCPEND.indication is generated
by a transmitter PHY entity to indicate the transmission completion of the
PLCP header to the local MAC entity.
     Effect of receipt - the receipt of this primitive by the MAC entity
will cause the MAC to record the time when this primitive is received only
if TIME_OF_DEPARTURE_REQUESTED is true in the
corresponding PHY_TXSTART.request.

According to an embodiment of the invention, the transmitter station 201 transmitting a mmWave frame such as a Beacon frame or an Announce frame, sets the value of the frame timestamp field so that it equals the value of the transmitter TSF timer at the time transmission of the data symbol containing the first bit of the MPDU over the wireless channel commences. The value of the timestamp includes any transmitting station delays while at least a portion of the frame traverses through the local PHY 202 from the MAC-PHY layers interface to the interface with the wireless channel, at the transmitter station 201.

When operating in the mmW band, at the receiver station 210, the timestamp value of the received frame is obtained and adjusted by adding an amount equal to the delay through the local PHY layer 212 of the receiver station 210 plus the time since the reception of the last data symbol of the PLCP header of the received frame was completed as indicated by PHY_RXSTART.indication, at the receiver station 210.

The example synchronization process in FIG. 3A applies to the processes in relation to FIGS. 5-7, however, the timestamp value (t1) is determined based on timing primitives in relation to FIGS. 5-7, rather than estimation in relation to FIG. 3A. Specifically, ta0 is the time when the symbol at the predefined position in the frame is at the transmitter MAC layer, ta1 is the time when that symbol is placed on the wireless channel by the transmitter, ta3' is the time value when that symbol is received on the wireless channel by the receiver PHY layer, ta4' is the time when the receiver begins local clock adjustment after receiving the symbol (i.e., beacon or other synchronization frames which carries time synchronization information such as timestamp information). The receiver adjusts its local clock value by adding Δ thereto (wherein Δ=ta1−ta3'). The timestamp includes the value ta1.

Although certain embodiments are described for the AP and a STA, embodiments of the invention are also applicable to synchronization between any two neighboring STAs. Thus, according to the present invention, to achieve higher time synchronization accuracy between the AP and the STAs, the local clock time is read in a place as close to the event trigger point as possible, which implies that local clock time is read in the PHY layer in order to minimize the propagating and processing delay.

According to embodiments of the present invention, when a packet is created by the MAC layer in the AP, the packet is timestamped with the time of the local clock when the packet arrives at the AP PHY layer for transmission over the channel, rather than the conventional timestamping at the AP MAC layer. This reduces processing delay (i.e., reduces access delay at the AP). Similarly, the STA clock is read at the STA PHY layer, rather than at the MAC layer, when the packet is received by the STA PHY layer. Further, the STA clock is updated as necessary based on the received packet timestamp. This further reduces processing delay (i.e., reduces receive delay at the STA).

As is known to those skilled in the art, the aforementioned example embodiments described above can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters/receivers, in wireless networks, etc. Further, said embodiments can take the form of an entirely hardware embodiment, an entirely software embodiment or an embodiment containing both hardware and software elements. Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message frames, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of time synchronization in a wireless communication system, comprising:
   transmitting a synchronization frame from a wireless transmitter to a wireless receiver over a wireless communication medium, wherein the synchronization frame includes a timestamp comprising a transmitting time indicating the wireless transmitter local time when a symbol at a predefined position of the synchronization frame is placed on the wireless communication medium for transmission, said predefined position is set to a particular point of one of a preamble and a header of the synchronization frame based on the wireless transmitter determining actual local time when said symbol at said predefined position is transmitted on the wireless communication medium using a particular time information parameter that carries a time value for said predefined position, and the parameter is transmitted at a physical medium dependent (PMD) sub-layer of a physical (PHY) layer of the wireless transmitter;
   receiving the synchronization frame at a PHY layer of the wireless receiver;
   determining a receiving time comprising the wireless receiver local time when said symbol of the synchronization frame was received from the wireless communication medium at the PHY layer of the wireless receiver;
   time synchronizing the wireless receiver with the wireless transmitter by:
      determining a difference between said timestamp and said receiving time; and
      adjusting the wireless receiver local time based on said difference to time synchronize the wireless receiver with the wireless transmitter,
   wherein a media access control (MAC) layer of the wireless transmitter determines the actual local time based on communication from a PHY layer convergence procedure (PLCP) sub-layer of the wireless transmitter PHY layer.

2. The method of claim 1, further comprising:
providing the received synchronization frame to a higher communication layer at the wireless receiver, wherein the synchronization frame arrives at said higher communication layer at an arriving time indicating a receiver local time at which the synchronization frame arrived at said higher communication layer;
wherein time synchronizing the wireless receiver with the wireless transmitter comprises:
   using said timestamp of the received synchronization frame to determine a difference between said timestamp and said receiving time;
   determining a revised local time based on a combination of said arriving time and said difference; and
   updating the receiver local time based on the revised local time to time synchronize the wireless receiver with the wireless transmitter.

3. The method of claim 1, further comprising:
reading a transmitter local clock to obtain the actual local time when said symbol at said predefined position of the synchronization packet is placed on the wireless communication medium for transmission to the wireless receiver; and
reading a receiver local clock to obtain the local time when said symbol at said predefined position of the synchronization packet is received on the wireless communication medium from the wireless transmitter.

4. The method of claim 1, wherein time synchronizing the wireless receiver with the wireless transmitter comprises:
adjusting the wireless receiver local time by adding a processing delay at the wireless receiver PHY layer and a processing delay between the wireless receiver PHY layer and said higher communication layer.

5. The method of claim 1, wherein:
said timestamp comprises a transmitting time estimating the wireless transmitter local time when said symbol at said predefined position of the synchronization frame is placed on the wireless communication medium for transmission.

6. The method of claim 1, wherein:
said timestamp comprises a transmitter local time when said symbol at said predefined position of the synchronization frame is placed on the wireless communication medium for transmission.

7. The method of claim 1, wherein:
wireless communication system comprises a wireless local area network; and the wireless receiver further comprises a MAC layer for wireless communication, and said higher communication layer of the wireless receiver comprises the MAC layer.

8. The method of claim 7, wherein:
said predefined position is set to a starting point of a preamble of the synchronization frame.

9. The method of claim 8, wherein:
the MAC layer of the wireless transmitter determines the actual local time when said symbol at said predefined position is transmitted on the wireless communication medium using the particular time information parameter, after the PLCP sub-layer of the wireless transmitter PHY layer issuing a PHY_TXSTART.confirmation (TXSTATUS) primitive to the wireless transmitter MAC layer, and the particular time information parameter comprises a TIME_OF_DEPARTURE parameter; and
the TIME_OF_DEPARTURE parameter carries the time value for the starting point of the preamble.

10. The method of claim 9, further comprising:
the MAC layer of the wireless receiver obtaining the estimated time that the PHY layer of the wireless receiver commenced receiving said preamble of the synchronization packet, using a RX_START_OF_FRAME_OFFSET parameter within a RXVECTOR, after a PLCP sub-layer of the wireless receiver PHY layer issues the PHY_RXSTART.indication (RXVECTOR) primitive to the wireless receiver MAC layer;
wherein the RX_START_OF_FRAME_OFFSET parameter carries the estimated time offset from the point in time at which the start of the synchronization frame preamble arrived at the wireless receiver PHY layer, to the point in time at which the PHY_RXSTART.indication primitive is issued to the wireless receiver MAC layer.

11. The method of claim 7, wherein said predefined position is set to a starting point of the PLCP header of the synchronization frame.

12. The method of claim 11, further comprising:
the MAC layer of the wireless transmitter determining the actual local time when said symbol at said predefined position is transmitted on the wireless communication medium since a PHY_TXSTART.confirmation is issued to the wireless transmitter MAC layer at the start of the PLCP header.

13. The method of claim 12, further comprising:
the PMD sub-layer of the wireless receiver PHY layer issuing a PM_DATA.ind to a PLCP sub-layer of the wireless receiver PHY layer, at the beginning of the PLCP header;
determining when the beginning of the PLCP header is received at the PMD sub-layer of the PHY layer; and
issuing PHY_RXSTART.indication (RXVECTOR) to the wireless receiver MAC layer at the end of PLCP header.

14. The method of claim 13, further comprising:
providing a RX_START_TIME_OF_PLCP_HEADER parameter in the RXVECTOR to record the time when the PMD_DATA. ind is issued to the PLCP sub-layer of the wireless receiver PHY layer;
wherein the RX_START_TIME_OF_PLCP_HEADER parameter indicates the time that the beginning of the PLCP header is received at the PMD sub-layer of the wireless receiver PHY layer.

15. The method of claim 7, wherein said predefined position is set to an end point of the PLCP header of the synchronization frame.

16. The method of claim 15, further comprising:
providing a PHY_TXPLCPEND.indication primitive;
the wireless transmitter obtaining local time directly using the primitive PHY_TXPLCPEND.indication issued to the transmitter MAC layer when the transmission of PLCP header is completed at the wireless transmitter PHY layer.

17. The method of claim 16, further comprising:
the wireless transmitter MAC layer obtaining the local time when transmission of the PLCP header is completed at the PHY layer, by recording the time when the PHY_TXPLCPEND.indication primitive is received from the PLCP sub-layer of the wireless transmitter PHY layer.

18. The method of claim 17, further comprising:
issuing PH_RXSTART.indication (RXVECTOR) to the wireless receiver MAC layer at the end of PLCP header; and
the wireless receiver MAC layer obtaining local time since the PHY_RXSTART.indication is issued to the wireless receiver MAC layer at the end of the PLCP header.

19. The method of claim 1, wherein the wireless communication system comprises a wireless local area network.

20. The method of claim 19, wherein the wireless local area network comprises a millimeter wave wireless local area network.

21. The method of claim 20, wherein the wireless transmitter and the wireless receiver include wireless radios operating in a 60 GHz and the wireless communication medium comprises a wireless radio frequency channel.

22. The method of claim 21, wherein:
the wireless transmitter comprises an access point; and
the synchronization packet comprises a broadcast beacon from transmitted by the access point over the wireless radio frequency channel.

23. The method of claim 1, wherein said predefined position is set to one of a starting point of the synchronization frame, staring point of the PLCP header of the synchronization frame, or an end point of the PLCP header of the synchronization frame.

24. A wireless communication system, comprising:
a wireless transmitter; and
a wireless receiver;
the wireless transmitter comprising a synchronization interface configured to transmit a synchronization frame to the wireless receiver over a wireless communication medium, the synchronization frame including a timestamp comprising a transmitting time indicating the wireless transmitter local time when a symbol at a predefined position of the synchronization frame is placed on the wireless communication medium for transmission, wherein said predefined position is set to a particular point of one of a preamble and a header of the synchronization frame based on the wireless transmitter determining actual local time when said symbol at said predefined position is transmitted on the wireless communication medium using a particular time information parameter that carries a time value for said predefined position, and the parameter is transmitted at a physical medium dependent (PMD) sub-layer of a physical (PHY) layer of the wireless transmitter;
the wireless receiver comprising a synchronization interface configured to determine a receiving time comprising the wireless receiver local time when said symbol of the synchronization frame was received from the wireless communication medium at a PHY layer of the wireless receiver, and to provide the received synchronization frame to a higher communication layer at the wireless receiver, wherein the synchronization frame arrives at said higher communication layer at an arriving time indicating a wireless receiver local time at which the synchronization frame arrived at said higher communication layer;

the wireless receiver synchronization interface is configured to time synchronize the wireless receiver with the wireless transmitter by being configured to:

determine a difference between said timestamp and said receiving time; and adjust the wireless receiver local time with said difference to time synchronize the wireless receiver with the wireless transmitter, wherein a media access control (MAC) layer of the wireless transmitter determines the actual local time based on communication from a PHY layer convergence procedure (PLCP) sub-layer of the wireless transmitter PHY layer.

25. The system of claim 24, wherein the wireless receiver synchronization interface time synchronizes the wireless receiver with the wireless transmitter based on the wireless receiver being configured to:

use said timestamp of the received synchronization frame to determine a difference between said timestamp and said receiving time;

determine a revised local time based on a combination of said arriving time and said difference; and update the wireless receiver local time based on the revised local time.

26. The system of claim 24, wherein:

the wireless transmitter synchronization interface is configured to read a transmitter local clock to obtain the local time when said symbol at said predefined position of the synchronization packet is placed on the wireless communication medium for transmission to the wireless receiver; and the wireless receiver synchronization interface is configured to read a receiver local clock to obtain the local time when said symbol at said predefined position of the synchronization packet is received on the wireless communication medium from the wireless transmitter.

27. The system of claim 24, wherein the wireless receiver synchronization interface is configured to adjust the wireless receiver local time by adding a processing delay at the wireless receiver layer and a processing delay between the wireless receiver PHY layer and said higher communication layer.

28. The system of claim 24, wherein said timestamp comprises a transmitting time estimating the wireless transmitter local time when said symbol at said predefined position of the synchronization frame is placed on the wireless communication medium for transmission.

29. The system of claim 24, wherein:

the wireless communication system comprises a wireless local area network;

the wireless receiver further comprises a MAC layer for wireless communication; and said higher communication layer of the receiver comprises wireless receiver MAC layer.

30. The system of claim 29, wherein:

said predefined position is set to a starting point of a preamble of the synchronization frame.

31. The system of claim 30, wherein:

the wireless transmitter synchronization interface includes the wireless transmitter MAC layer for determining the actual local time when said symbol at said predefined position is transmitted on the wireless communication medium using the particular time information parameter, after the PLCP sub-layer of the wireless transmitter PHY layer issues a PHY_TXSTART. confirmation (TX-STATUS) primitive to the transmitter MAC layer, wherein the particular time information parameter comprises a TIME_OF_DEPARTURE parameter; and the TIME_OF_DEPARTURE parameter carries the time value for the starting point of the preamble.

32. The system of claim 31, wherein:

the wireless receiver synchronization interface includes the wireless receiver MAC layer that is configured to obtain the estimated time that the PHY layer of the wireless receiver commenced receiving said preamble of the synchronization packet, using a RX_START_OF_FRAME_OFFSET parameter within a RXVECTOR, after a PLCP sub-layer of the wireless receiver PHY layer issues the PHY_RXSTART. indication (RXVECTOR) primitive to the wireless receiver MAC layer; and the RX_START_OF_FRAME_OFFSET parameter carries the estimated time offset from the point in time at which the start of the synchronization frame preamble arrived at the wireless receiver PHY layer, to the point in time at which the PHY_RXSTART. indication primitive is issued to the wireless receiver MAC layer.

33. The system of claim 29, wherein said predefined position is set to a starting point of the PLCP header of the synchronization frame.

34. The system of claim 33, wherein:

the wireless transmitter synchronization interface includes the wireless transmitter MAC layer for determining the actual local time when said symbol at said predefined position is transmitted on the wireless communication medium since a PHY_TXSTART.confirmation is issued to the wireless transmitter MAC layer at the start of the PLCP header.

35. The system of claim 34, wherein:

the PMD sub-layer of the wireless receiver PHY layer is configured to issue a PM_DATA.ind to the PLCP sub-layer of the wireless receiver PHY layer, at the beginning of the PLCP header;

the wireless receiver synchronization interface is configured to determine when the beginning of the PLCP header is received at the PMD sub-layer of the PHY layer; and the wireless receiver PHY layer is configured to issue a PHY_RXSTART.indication (RXVECTOR) to the wireless receiver MAC layer at the end of the PLCP header.

36. The system of claim 35, wherein:

a RX_START_TIME_OF_PLCP_HEADER parameter is provided in the RXVECTOR and is configured to record the time when the PMD_DATA. ind is issued to the PLCP sub-layer of the wireless receiver PHY layer; and the RX_START_TIME_OF_PLCP_HEADER parameter indicates the time that the beginning of the PLCP header is received at the PMD sub-layer of the wireless receiver PHY layer.

37. The system of claim 29, wherein said predefined position is set to an end point of the PLCP header of the synchronization frame.

38. The system of claim 37, wherein:

a PHY_TXPLCPEND.indication primitive is provided; and the wireless transmitter obtains local time directly using the primitive PHY_TXPLCPEND.indication issued to the wireless transmitter MAC layer when the transmission of PLCP header is completed at the wireless transmitter PHY layer.

39. The system of claim 38, wherein:
the wireless transmitter MAC layer obtains the local time when transmission of the PLCP header is completed at the PHY layer, by recording the time when the PHY_TXPLCPEND.indication primitive is received from a PHY layer convergence procedure (PLCP) sub-layer of the wireless transmitter PHY layer.

40. The system of claim 39, wherein:
a PHY_RXSTART.indication (RXVECTOR) is issued to the wireless receiver MAC layer at the end of the PLCP header; and
the wireless receiver MAC layer obtains local time since the PHY_RXSTART.indication is issued to the wireless receiver MAC layer at the end of the PLCP header.

41. The system of claim 24, wherein:
the wireless communication system comprises a millimeter wave wireless local area network and the wireless communication medium comprises a wireless radio frequency channel;
the wireless transmitter comprises an access point; and
the synchronization packet comprises a broadcast beacon transmitted by the access point over the wireless radio frequency channel.

42. A wireless receiver, comprising:
a wireless receiver physical (PHY) layer configured to perform wireless communication to receive a synchronization frame over a wireless communication medium, the synchronization frame including a timestamp comprising a transmitting time indicating a wireless transmitter local time when a symbol at a predefined position of the synchronization frame is placed on the wireless communication medium for transmission to the wireless receiver, wherein said predefined position is set to a particular point of one of a preamble and a header of the synchronization frame based on the wireless transmitter determining actual local time when said symbol at said predefined position is received, from a physical medium dependent (PMD) sub-layer of a wireless transmitter physical (PHY) layer, on the wireless communication medium using a particular time information parameter that carries a time value for said predefined position; and
a synchronization interface configured to determine a receiving time comprising the wireless receiver local time when said symbol of the synchronization frame was received from the wireless communication medium at the PHY layer of the wireless receiver, and to provide the received synchronization frame to a higher communication layer at the wireless receiver, wherein the synchronization frame arrives at said higher communication layer at an arriving time indicating a wireless receiver local time at which the synchronization frame arrived at said higher layer;
the wireless receiver synchronization interface is configured to time synchronize the wireless receiver with the wireless transmitter by being configured to:
determine a difference between said timestamp and said receiving time; and
adjust the wireless receiver local time with said difference to time synchronize the wireless receiver with the wireless transmitter,
wherein a media access control (MAC) layer of the wireless transmitter obtains the actual local time based on communication from a PHY layer convergence procedure (PLCP) sub-layer of the wireless transmitter PHY layer.

43. The wireless receiver of claim 42, wherein the wireless receiver synchronization interface time synchronizes the wireless receiver based on the wireless receiver being configured to:
use said timestamp of the received synchronization frame to determine a difference between said timestamp and said receiving time;
determine a revised local time based on a combination of said arriving time and said difference; and
update the wireless receiver local time based on the revised local time.

44. The wireless receiver of claim 42, wherein:
the wireless receiver synchronization interface is configured to read a receiver local clock to obtain the local time when said symbol at said predefined position of the synchronization packet is received on the wireless communication medium.

45. The wireless receiver of claim 42, wherein the wireless receiver synchronization interface is configured to adjust the wireless receiver local time by adding a processing delay at the wireless receiver PHY layer and a processing delay between the wireless receiver PHY layer and said higher communication layer.

46. The wireless receiver of claim 42, wherein said timestamp comprises a transmitting time estimating a wireless transmitter local time when said symbol at said predefined position of the synchronization frame is placed on the wireless communication medium for transmission.

47. The wireless receiver of claim 42, wherein:
the wireless communication medium comprises a wireless local area network; and
said higher communication layer of the wireless receiver comprises a media access control (MAC) layer.

48. The wireless receiver of claim 47, wherein:
said predefined position is set to a starting point of a preamble of the synchronization frame.

49. The wireless receiver of claim 48, wherein:
the wireless receiver synchronization interface includes the wireless receiver MAC layer for obtaining the estimated time that the PHY layer of the wireless receiver commenced receiving said preamble of the synchronization packet, using a RX_START_OF_FRAME_OFFSET parameter within a RXVECTOR, after the PLCP sub-layer of the wireless receiver PHY layer issues the PHY_RXSTART.indication (RXVECTOR) primitive to the wireless receiver MAC layer;
the RX_START_OF_FRAME_OFFSET parameter carries the estimated time offset from the point in time at which the start of the synchronization frame preamble arrived at the wireless receiver PHY layer, to the point in time at which the PHY_RXSTART.indication primitive is issued to the wireless receiver MAC layer;
the particular time information parameter comprises a TIME_OF_DEPARTURE parameter; and
the TIME_OF_DEPARTURE parameter carries the time value for the starting point of the preamble, to be transmitted at the PMD sub-layer of the transmitter PHY layer.

50. The wireless receiver of claim 47, wherein said predefined position is set to a starting point of the PLCP header of the synchronization frame.

51. The wireless receiver of claim 50, wherein:
the PMD sub-layer of the wireless receiver PHY layer is configured to issue a PM_DATA.ind to the PLCP sub-layer of the wireless receiver PHY layer, at the beginning of the PLCP header;
the wireless receiver synchronization interface is configured to determine when the beginning of the PLCP header is received at the PMD sub-layer of the wireless receiver PHY layer; and the wireless receiver PHY layer is configured to issue a PHY_RXSTART.indication (RXVECTOR) to the wireless receiver MAC layer at the end of PLCP header.

52. The wireless receiver of claim 51, wherein:
a RX_START_TIME_OF_PLCP_HEADER parameter is provided in the RXVECTOR to record the time when the PMD_DATA.ind is issued to the PLCP sub-layer of the wireless receiver PHY layer; and
the RX_START_TIME_OF_PLCP_HEADER parameter indicates the time that the beginning of the PLCP header is received at the PMD sub-layer of the wireless receiver PHY layer.

53. The wireless receiver of claim 47, wherein said predefined position is set to an end point of the PLCP header of the synchronization frame.

54. The wireless receiver of claim 53, wherein:
a PHY_RXSTART.indication (RXVECTOR) is issued to the wireless receiver MAC layer at the end of the PLCP header; and
the wireless receiver MAC layer obtains local time since the PHY_RXSTART.indication is issued to the wireless receiver MAC layer at the end of the PLCP header.

55. The wireless receiver of claim 42, wherein:
the wireless communication system comprises a millimeter wave wireless local area network;
the wireless communication medium comprises a wireless radio frequency channel; and
the synchronization packet comprises a broadcast beacon received from an access point over the wireless radio frequency channel.

* * * * *